United States Patent [19]
Hehl et al.

[11] Patent Number: 5,927,803
[45] Date of Patent: Jul. 27, 1999

[54] ROLLOVER PROTECTION SYSTEM FOR A PASSENGER CAR

[75] Inventors: Olaf Hehl, Munich; Guenther Premm, Vaterstetten, both of Germany

[73] Assignee: Bayerische Motoren Werke Aktiengesellschaft, Munich, Germany

[21] Appl. No.: 08/986,111

[22] Filed: Dec. 5, 1997

[30] Foreign Application Priority Data

Dec. 6, 1996 [DE] Germany .......................... 196 50 593

[51] Int. Cl.⁶ .............................. B60N 2/42; B60R 21/02
[52] U.S. Cl. ...................... 297/216.12; 297/391; 280/756
[58] Field of Search .............................. 297/216.12, 391, 297/404; 280/756

[56] References Cited

U.S. PATENT DOCUMENTS

| | | | |
|---|---|---|---|
| 5,094,478 | 3/1992 | Pfanzeder et al. | 280/756 |
| 5,110,185 | 5/1992 | Schmutz et al. | 280/756 X |
| 5,458,396 | 10/1995 | Rost | 297/216.12 |
| 5,626,361 | 5/1997 | Heiner | 280/756 |
| 5,655,791 | 8/1997 | Nowack et al. | 280/756 |
| 5,664,840 | 9/1997 | Stenzel | 297/391 |

FOREIGN PATENT DOCUMENTS

| | | |
|---|---|---|
| 0 407 741 | 1/1991 | European Pat. Off. . |
| 0 439 565 | 8/1991 | European Pat. Off. . |
| 0 456 646 | 11/1991 | European Pat. Off. . |
| 504482 | 9/1992 | European Pat. Off. ............... 280/756 |
| 0 623 492 | 11/1994 | European Pat. Off. . |
| 38 22 461 | 1/1990 | Germany . |
| 90 01 215 | 5/1990 | Germany . |
| 39 22 509 | 1/1991 | Germany . |
| 39 30 171 | 3/1991 | Germany . |
| 42 37 348 | 5/1993 | Germany . |
| 92 00 457 | 7/1993 | Germany . |
| 4302152 | 7/1994 | Germany ............................... 280/756 |
| 295 14 313 | 12/1995 | Germany . |

*Primary Examiner*—Peter M. Cuomo
*Assistant Examiner*—Rodney B. White
*Attorney, Agent, or Firm*—Evenson, McKeown, Edwards & Lenahan, P.L.L.C.

[57] ABSTRACT

A rollover protection system for a passenger car, particularly for a convertible, includes a headrest 2 assigned to a vehicle seat and a rollover bar 1 which can be translationally displaced from a lowered inoperative position upwards into its supporting position. In its inoperative position, the rollover bar is accommodated with its upper section in a downwardly open recess 6 of the headrest 2. The recess 6 is closed in the upward direction by a flap 9 which can be swivelled away when the rollover bar 1 is moved out. The rollover bar is supported on the vehicle body 5 not by way of the backrest structure but directly. The new method of construction permits a simplified mounting of the whole system, a high operational reliability and an inconspicuous design.

19 Claims, 1 Drawing Sheet

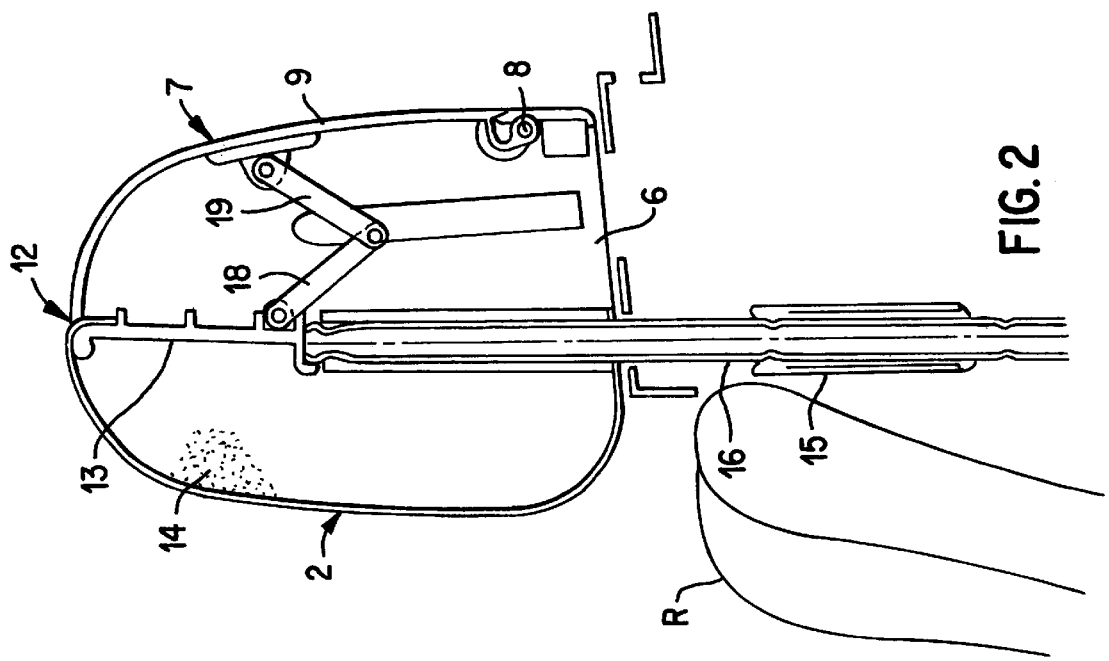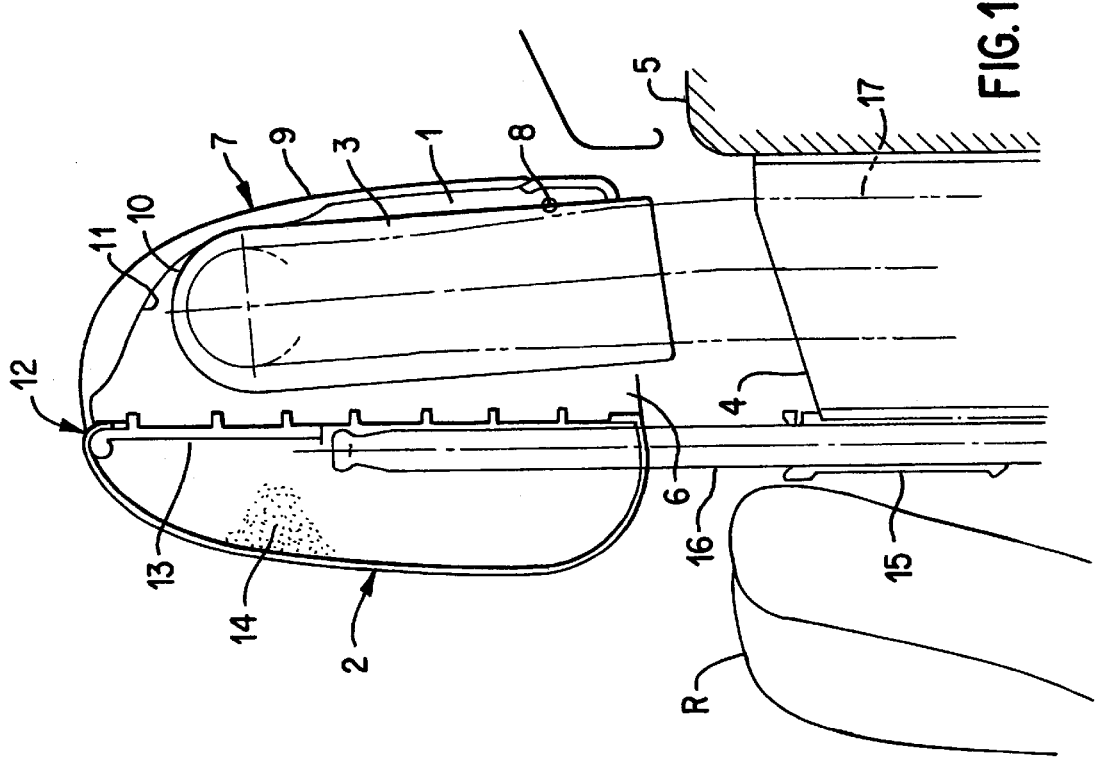

ROLLOVER PROTECTION SYSTEM FOR A PASSENGER CAR

BACKGROUND AND SUMMARY OF THE INVENTION

This application claims the priority of German application 196 50 593.3, the disclosure of which is expressly incorporated by reference herein.

The invention relates to a rollover protection system for a passenger car, particularly a convertible.

Several rollover protection systems of this type are known. In the case of a system according to German Patent Document DE 39 30 171 C2 and European Patent Document EP 0 456 646 B1, the rollover bar is arranged in the backrest and, in the inoperative position, extends with its upper outer contour flush with respect to the adjoining contour of the head rest. In both cases, in the event of a rollover, the rollover protection body or the rollover bar is supported by way of the supporting structure of the backrest with respect to the vehicle body. On the one hand, this saves space since not only the headrest but also the rollover bar, because of the integration into the seat backrest, do not have to be housed separately in the vehicle and be supported with respect to the vehicle. On the other hand, considerable expenditures are required at the adjusting rails, in the adjusting joints and adjusting motors as well as in its supporting structure.

Furthermore, it is known from European Patent Document EP 0 407 741 A2 and European Patent Document EP 0435 565 B1 to mount an additional cushioning, which serves as a headrest, on the uppermost section of the rollover bar.

From German Patent Document DE 38 22 461 C2, it is finally also known to arrange and support a vertically displaceable headrest in a vertically displaceable manner on the legs of a U-shaped rollover bar.

Objects of the invention are to provide an arrangement of a rollover bar and of a headrest in a passenger car which is attractive in its design, requires little space and nevertheless permits a high operational reliability of the rollover bar as well as of the headrest.

These and other objects have been achieved according to the present invention by providing rollover protection system for a motor vehicle, comprising; a headrest assigned to a vehicle seat; and a rollover bar which can be displaced at least approximately translationally from a lowered inoperative position upwards into a supporting position, an upper section of the rollover bar being integrated into the headrest of the vehicle seat in the inoperative position, the headrest having a recess which is open toward the bottom and in which said upper section of the rollover bar is accommodated in the inoperative position.

Since the rollover bar extends at its upper section into the recess of the headrest, on the one hand, a particularly space-saving housing is provided because it can be placed very closely behind the supporting body and the cushioning of the headrest. The presence of a rollover bar is not visible from the outside. Also, no separate covers, which may have an aesthetically disturbing effect, are to be provided in the covering in the zone taken up by the rollover bar.

By means of the direct support of the rollover bar, or a cassette which receives and carries the rollover bar, on the vehicle body, the expenditures can be eliminated which, in the case of the closest state of the art, are required with respect to the stability of the backrest structure, the adjusting elements of the whole seat and at the inclination adjusting mechanism.

The rollover bar, which inherently has a high stability, in the event of certain load conditions, can also very effectively additionally support the headrest. For this purpose, the supporting body for the headrest cushion must be appropriately designed such that a support basis of the headrest with respect to the upper section of the rollover bar which is as large as possible is ensured, on which, in the event of a high loading of the headrest from the front, a stable force transmission takes place from the headrest to the rollover bar.

Other objects, advantages and novel features of the present invention will become apparent from the following detailed description of the invention when considered in conjunction with the accompanying drawings.

BRIEF DESCRIPTION OF THE DRAWINGS

FIG. 1 is a vertical longitudinal sectional view of the headrest according to a preferred embodiment of the present invention in the area of the upper section of a U-shaped rollover bar and the upper backrest; and FIG. 2 is another sectional view in a plane which is parallel to the sectional plane of FIG. 1.

DETAILED DESCRIPTION OF THE DRAWINGS

FIG. 1 is a lateral view of the U-shaped rollover bar 1 in the area of its upper section. The rollover bar is assigned to a vehicle seat, for example as shown inthe present embodiment, a rear seat indicated by its backrest R. The headrest 2 is situated above the backrest R of this vehicle seat. The rollover bar 1, which is provided with a cushioning 3 in its upper area, is guided and supported in a cassette 4 which is fastened on the vehicle body 5.

The headrest 2 and the rollover bar 1 are therefore not supported by way of the structure of the backrest R on the vehicle floor but by way of the cassette 4 directly on the vehicle body 5.

Controlled by a sensor which recognizes a vehicle rollover, the rollover bar can be moved from its inoperative position illustrated in FIG. 1 by suitable driving elements, such as prestressed springs, into a moved-out supporting position in which it is locked automatically.

As illustrated in FIG. 1, the headrest 2 has a recess 6 which is open in the downward direction and in which the upper section of the rollover bar 1 is received in the inoperative position.

At least in its upper area, the recess 6 is closed off by means of a detachable covering 7. In the preferred embodiment, the covering 7 is a flap 9 which can be swivelled about a transverse axis 8.

As illustrated, the swivelling axis 8 of the flap 9 is provided in the lower area of the headrest. In addition, the flap 9 has in its upper section, at least in the center area of its width, an oblique deflection surface 11 which interacts with the upper cross web 10 of the U-shaped rollover bar. In the illustrated preferred embodiment, the deflection surface 11 is curved and ends approximately vertically on the bottom, closely adjacent to the upper end of the rollover bar 1. The flap 9 is reinforced in the section having the deflection surface 11.

The flap 9 can be connected with the remaining body of the headrest 2 by way of a tear zone 12. However, it may also be held on the remaining body of the headrest 2 by way of (not shown) spring clips.

When the rollover bar 1 is accelerated upwards from the inoperative position illustrated in FIG. 1, it slides along the deflection surface. Because of the selected curvature of the deflection surface 11, the rollover bar 1 meets little resistance at the start of its movement, but, because of the selected curvature, this resistance will gradually increase so that the tear zone will tear open or the spring clips will yield and the flap 9 will swivel rearward through a preselectable angle. The preselectable angle may be set by two pivotably connected levers 18 and 19 arranged as to be seen in FIG. 2, one of them linked to the supporting part 13 of the headrest 2, the other to the flaps. The rollover bar 1 will then arrive in its supporting position which projects upwards beyond the window line of the vehicle, in which supporting position it is fixed by means of a suitable detent mechanism.

However, the flap 9 may also be releasable from the remaining headrest body by way of a suitable unlocking mechanism. Expediently, the unlocking mechanism would then be operable by the rollover bar 1.

The supporting body 13 of the headrest 2, which is only outlined in the drawing, and its cushioning body 14 are arranged in front of the recess 6. Independently of the rollover bar 1, the headrest 2 can be adjusted to the respective individually desired height, since the recess is configured with appropriate dimensions to allow movement of the headrest to a plurality of positions without interference from the rollover bar 1. As mentioned above, in the case of the illustrated embodiment, the headrest 2 and the rollover bar 1 are assigned to a rearward vehicle seat. However, the idea of the invention can also be implemented on a front seat of a motor vehicle.

The guides 15 for the supporting rods 16 of the headrest 2 are arranged on the cassette 4 which is fastened to the vehicle body 5 and receives and supports the U-legs 17 of the rollover bar 1. The guides 15 and their support by way of the cassette 4 on the vehicle body 5 must be so stable that, in the event of a severe impact of the head, no displacement of the headrest 2 toward the rear takes place which is so severe and possibly lasting that the moving-out movement of the rollover bar 1 could be hindered. On the other hand, the headrest 2 can, even after a slighter (elastic) displacement toward the rear, be effectively supported on the rollover bar 1 and therefore still further increase the safety of the seat user, for example, in the event of a rear impact. A plastic deformation of the headrest support must be avoided in this case.

The new rollover protection system, including the arrangement, construction and vehicle-body-fixed support of the headrest, permits low mounting expenditures and is therefore reasonable with respect to cost. The system nevertheless leads to a further increase of the operational reliability and allows improvements of the design.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Rollover protection system in a motor vehicle, comprising: a headrest coupled to a vehicle seat; and a rollover bar coupled to a body of the motor vehicle, said rollover bar being displaceable at least approximately translationally from a lowered inoperative position upwards into a supporting position, an upper section of the rollover bar being disposed in the headrest of the vehicle seat in the inoperative position, the headrest defining a recess which is open toward a downward direction and which is closed off toward an upward direction by a releasable covering at least in an upper area of the headrest, said upper section of the rollover bar being accommodated in the recess in the inoperative position.

2. Rollover protection system according to claim 1, wherein the rollover bar is coupled to the body of the motor vehicle via adjusting and guiding elements arranged directly on the body of the motor vehicle.

3. Rollover protection system according to claim 1, wherein the vehicle seat is a rearward vehicle seat.

4. Rollover protection system according to claim 1, wherein said rollover bar has U-legs which are supported in a cassette fastened to the body of the motor vehicle, and wherein said headrest is supported via at least one supporting rod disposed in a guide arranged on said cassette.

5. Rollover protection system according to claim 1, wherein the covering is a flap which is swivellable about a transverse axis.

6. Rollover protection system according to claim 5, wherein the transverse axis of the flap is provided proximate a lower area of the headrest.

7. Rollover protection system according to claim 5, wherein an upper section of the flap has an oblique deflection surface which interacts with a cross bar of the rollover bar.

8. Rollover protection system according to claim 7, wherein the deflection surface is curved and has a lower portion which extends approximately vertically.

9. Rollover protection system according to claim 7, wherein the flap is reinforced at the deflection surface.

10. Rollover protection system according to claim 1, wherein the covering is connected via a tear zone with a repairing body of the headrest.

11. Rollover protection system according to claim 1, wherein the covering is releasable with respect to a remaining body of the headrest via an unlocking mechanism.

12. Rollover protection system according to claim 11, wherein the unlocking mechanism is operable by the rollover bar.

13. Rollover protection system according to claim 1, wherein a supporting body and a cushioning body of the headrest are arranged in front of the recess.

14. Rollover protection system in a motor vehicle, comprising: a headrest coupled to a vehicle seat; and a rollover bar coupled to a body of the motor vehicle, said rollover bar being displaceable at least approximately translationally from a lowered inoperative position upwards into a supporting position, an upper section of the rollover bar being disposed in the headrest of the vehicle seat in the inoperative position, the headrest defining a recess which is open toward a downward direction and which is closed off toward an upward direction, said upper section of the rollover bar being accommodated in the recess in the inoperative position, wherein a height of the headrest is adjustable independently of the rollover bar.

15. Rollover protection system according to claim 14, wherein the recess of the headrest accommodating the rollover bar is closed off by a releasable covering at least in an upper area of the headrest.

16. Rollover protection system for a vehicle seat in a motor vehicle, comprising:

a rollover bar arranged behind the vehicle seat and coupled to a body of the motor vehicle, said rollover bar being displaceable from a lowered inoperative position upwards into a supporting position; and a headrest arranged above the vehicle seat, said headrest defining a recess which is open in a downward direction, an upper section of the rollover bar being disposed in said recess when the rollover bar is in the lowered inoperative position, said recess being closed in an upward direction by a releasable covering at least in an upper area of the headrest when the rollover bar is in the lowered inoperative position.

17. Rollover protection system according to claim 16, wherein the rollover bar is coupled to the body of the motor vehicle via adjusting and guiding elements arranged directly on the body of the vehicle.

18. Rollover protection system according to claim 16, wherein said rollover bar has U-legs which are supported in a cassette fastened to the body of the motor vehicle, and wherein said headrest is supported via at least one supporting rod disposed in a guide arranged on said cassette.

19. Rollover protection system according to claim 16, wherein the covering is a flap which is swivellable about a transverse axis.

\* \* \* \* \*